United States Patent
Overkempe et al.

(10) Patent No.: US 8,833,450 B2
(45) Date of Patent: Sep. 16, 2014

(54) NITROGEN CONTAINING COMPOUNDS AS CORROSION INHIBITORS

(71) Applicant: Akzo Nobel N.V., Arnhem (NL)

(72) Inventors: Kornelis Overkempe, Holten (NL); William John Ernest Parr, Holten (NL); Johanna Christina Speelman, Warnsveld (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 13/861,829

(22) Filed: Apr. 12, 2013

(65) Prior Publication Data

US 2013/0233543 A1 Sep. 12, 2013

Related U.S. Application Data

(63) Continuation of application No. 10/498,074, filed as application No. PCT/EP02/13567 on Nov. 29, 2002, now abandoned.

(30) Foreign Application Priority Data

Dec. 12, 2001 (SE) ........................................ 0104176

(51) Int. Cl.
- *C23F 11/14* (2006.01)
- *C09K 8/54* (2006.01)
- *E21B 4/02* (2006.01)
- *E21B 41/02* (2006.01)

(52) U.S. Cl.
CPC ................. *C09K 8/54* (2013.01); *C23F 11/145* (2013.01); *C23F 11/142* (2013.01); *E21B 41/02* (2013.01)
USPC ............. 166/279; 422/12; 507/239; 252/392; 252/403

(58) Field of Classification Search
USPC ............. 252/392, 403; 507/239, 241; 422/12; 166/279
See application file for complete search history.

(56) References Cited

U.S. PATENT DOCUMENTS

| | | | |
|---|---|---|---|
| 2,290,411 A * | 7/1942 | Keiser et al. ................... 516/161 |
| 2,759,021 A | 8/1956 | Gaar et al. |
| 2,952,635 A | 9/1960 | Spivack et al. |
| 3,029,125 A * | 4/1962 | Hummel .......................... 422/16 |
| 2,956,889 A | 8/1965 | Brown |
| 3,203,904 A | 8/1965 | Denman |
| 3,378,581 A * | 4/1968 | Hummel ........................ 562/584 |
| 3,384,590 A * | 5/1968 | Eversole et al. ................. 252/70 |
| 3,438,901 A * | 4/1969 | Vassileff ....................... 252/79.3 |
| 3,620,974 A * | 11/1971 | Stanford et al. ............... 507/236 |
| 3,977,994 A | 8/1976 | Geiser |
| 4,302,354 A * | 11/1981 | Giede et al. .................... 252/392 |
| 4,474,682 A * | 10/1984 | Billenstein et al. ............ 516/168 |
| 4,746,328 A * | 5/1988 | Sakamoto et al. .............. 44/342 |
| 4,997,912 A * | 3/1991 | Wirtz et al. .................... 530/232 |
| 5,283,124 A * | 2/1994 | Fujibayashi et al. ........... 523/404 |

FOREIGN PATENT DOCUMENTS

| | | |
|---|---|---|
| BE | 841536 | 11/1976 |
| BE | 841567 | 11/1976 |
| EP | 0750033 A1 | 12/1996 |
| EP | 0903398 A2 | 3/1999 |
| JP | S 58-21488 | 2/1983 |
| JP | S 58-91176 | 5/1983 |
| WO | WO 03/054251 | 7/2003 |

OTHER PUBLICATIONS

International Preliminary Examination Report completed Aug. 13, 2004 of parent application PCT/EP2002/013567.
International Search Report mailed Jun. 9, 2004 of parent application PCT/EP2002/013567.
English Translation of Foreign Patent Document No. JPS58-21488.
English Translation of Foreign Patent Document No. JPS58-91176.
Abstract of BE 841536 (1976).
Abstract of BE 841567 (1976).

* cited by examiner

*Primary Examiner* — Joseph D Anthony
(74) *Attorney, Agent, or Firm* — Sugiarto Hadikusumo

(57) ABSTRACT

The present invention relates to nitrogen-containing hydroxyethyl substituted compounds to be used as corrosion inhibitors for metal surfaces, for example in aqueous systems and in particular in oil-field applications, e.g. in oil or gas wells, and which could be used under sweet-well conditions as well as under sour-well conditions. It may also be used in oil-field acidizing and fracture-acidizing well stimulation treatment. The compounds belong to the group of partly ethoxylated fatty alkylamines, partly ethoxylated alkyletheramines and partly or fully hydroxyethyl substituted alkylamidopropylamines. The corrosion inhibitors have the formula (I) where R is a hydrocarbyl or an acyl group having 14-24 carbon atoms, or the group $R'OCH_2CH_2CH_2$ where R' is a hydrocarbyl group with 14-24 carbon atoms; X is hydrogen, $C_2H_4OH$ or the group Y is hydrogen or $C_2H_4OH$ and n is 0-3, with the proviso that at least one of the symbols X and Y is $C_2H_4OH$, at most one of the symbols X is n is at least one when R is an acyl group, and when R is a hydrocarbyl group or the group $R'OCH_2CH_2CH_2$ at least one of the symbols X and Y is hydrogen.

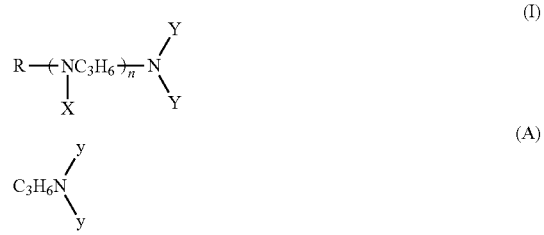

6 Claims, No Drawings

NITROGEN CONTAINING COMPOUNDS AS CORROSION INHIBITORS

This application is a continuation of U.S. patent application Ser. No. 10/498,074, filed Jun. 9, 2004, now abandoned, which is a National Stage entry of International Application PCT/EP2002/013567, filed Nov. 29, 2002, which claims the benefit of Swedish Patent Application No. 0104176-3, filed Dec. 12, 2001. The contents of the aforementioned applications are incorporated herein by reference in their entireties.

The present invention relates to nitrogen-containing hydroxyethyl substituted compounds to be used as corrosion inhibitors for metal surfaces, for example in aqueous systems and in particular in oil-field applications, e.g. in oil or gas wells, and which could be used under sweet-well conditions as well as under sour-well conditions. It may also be used in oil-field acidizing and fracture-acidizing well stimulation treatment. The compounds belong to the group of partly ethoxylated fatty alkylamines, partly ethoxylated alkyletheramines and partly or fully hydroxyethyl substituted alkylamidopropylamines.

The use of amines as corrosion inhibitors in different kinds of systems is well known. Also ethoxylated amines have been described as components in rust inhibiting compositions, as for example in U.S. Pat. No. 3,977,994 where a rust inhibiting composition for metal surfaces is disclosed. This composition contains a C16-C20 organic acid and a C3-C12 N-alkyl or N-cycloalkyl-substituted ethanolamine.

In EP-A1-750 033 a hydraulic fluid composition based on a boric ester of a glycol ether is disclosed, which comprises a corrosion-inhibiting system that includes at least one constituent chosen from fatty mono- di- or polyamines, optionally ethoxylated in all active positions, or the salts of one or more carboxylic acids with the said amines, and esters between one or more carboxylic fatty acids and a polyoxyalkylene glycol.

EP-A2-903398 describes a method for increasing the corrosion resistance of a lubricating grease, by the addition of a minor portion of one or more alkoxylated C1-C30 alkylamines containing from 0 to 50 moles of alkoxide. All working examples describe compositions containing alkoxylated fatty amines where all active positions were substituted with ethylene oxide. Particularly preferred was the tallow amine derivative with 5 moles of ethylene oxide.

BE 841 567 and BE 841 536 disclose N-alkyl-aminoalkanols where the alkyl chain carries a hydroxy substituent, said compounds being obtained from α-olefin epoxides and amines or aminoalkanols. These compounds work as corrosion inhibitors in an aqueous environment.

In JP 58091176-A N-alkyl substituted alkanolamines with one or two alkyl chains containing a total of less than 7 carbon atoms are described as anti-corrosion additives for calcium chloride brine systems. Among the compounds specifically mentioned are 2-ethylaminoethanol, 2-n-butylaminoethanol, 2-dimethylaminoethanol and 2-diethylaminoethanol. The compounds could also be used in the presence of a triazole.

In JP 58021488-A an aqueous hydraulic fluid composition is disclosed that comprises a sorbitan ester, an alkoxylated alkylamide, an alkoxylated alkylmonoamine or an alkoxylated alkylpropylenediamine and water. This hydraulic fluid exhibits a suitable viscosity and does not rust. The amines disclosed in the working examples were oleylamine+5EO or N-(tallow alkyl)propylenediamine+5EO, where all active positions are substituted by ethylene oxide.

In U.S. Pat. No. 3,029,125 a process for inhibiting corrosion in steam and condensate return systems is disclosed, where alkylene diamines with a hydrocarbyl chain containing 10 to 32 carbon atoms, and that have been hydroxyalkylated with from 1 to 4 moles of a lower alkylene oxide, are used as corrosion inhibitors. It is stated in column 6 lines 66-71 that optimum results in evaluating compositions provided in accordance with the invention have been obtained with fully oxyalkylated long chain hydrocarbon polyamines in which all of the active hydrogen atoms attached to nitrogen atoms have been substituted by hydroxy lower alkyl groups.

Although a variety of corrosion inhibitors to be used in the presence of freshwater, seawater or brine has been developed, there is still a need for more effective corrosion inhibitors and compositions, especially with the strenuous conditions prevailing in oil-well applications.

It has now surprisingly been found that a hydroxyethyl substituted amine having the formula

where R is a hydrocarbyl or an acyl group having 14-24, preferably 16-22, carbon atoms, or the group R'OCH$_2$CH$_2$CH$_2$ where R' is a hydrocarbyl group with 14-24, preferably 16-22, carbon atoms; X is hydrogen, C$_2$H$_4$OH or the group

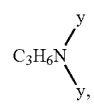

Y is hydrogen or C$_2$H$_4$OH and n is 0-3, preferably 0-2 and most preferably 1-2, with the proviso that at least one of the symbols X and Y is C$_2$H$_4$OH, at most one of the symbols X is

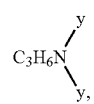

n is at least one when R is an acyl group, and when R is a hydrocarbyl group or the group R'OCH$_2$CH$_2$CH$_2$ at least one of the symbols X and Y is hydrogen; can be used as a corrosion inhibitor for metal surfaces, e.g. in aqueous environments. Various metals, such as iron, copper, zinc, aluminum and cobalt, as well as alloys, such as brass and iron-containing alloys, can be protected by said compounds. In addition they also inhibit scale formation.

The hydroxyethyl substituted alkylamines or alkyletheramines of formula (I) are only partly substituted, i.e. not all nitrogen positions containing active hydrogen atoms are substituted by hydroxyethyl or polyethylene glycol groups. These compounds are preferably obtained by ethoxylation of alkylamines or alkyl etheramines, and will hereafter be referred to as partly ethoxylated amines. It has surprisingly been found that the said amines have a much better corrosion-inhibiting ability than the corresponding unethoxylated or fully ethoxylated amines, where the phrase "fully ethoxylated amines" refer to amines where all nitrogen positions containing active hydrogen atoms are substituted by hydroxyethyl or polyethylene glycol groups.

Suitable examples of the corrosion inhibitors according to the present invention are the ethoxylated alkylamines of formula I, where R is a hydrocarbyl group having 14-24, preferably 16-22, carbon atoms, and X, Y, and n have the same meaning as above.

Suitable examples of alkylamines that could be used as starting materials for the ethoxylated alkylamines are fatty monoamines according to the formula R1NH$_2$ (II), where R1 is an aliphatic group having 14-24, preferably 16-22 carbon atoms; fatty diamines according to the formula R2NHCH$_2$CH$_2$CH$_2$NH$_2$ (III), where R2 is an aliphatic group having 14-24, preferably 16-22 carbon atoms; linear fatty triamines according to the formula R3NHCH$_2$CH$_2$CH$_2$NHCH$_2$CH$_2$CH$_2$NH$_2$ (IV), where R3 is an aliphatic group having 14-24, preferably 16-22 carbon atoms; and branched fatty triamines (Y-triamines) according to the formula R4N(CH$_2$CH$_2$CH$_2$NH$_2$)$_2$ (V), where R4 is an aliphatic group having 14-24, preferably 16-22 carbon atoms. The degree of hydroxyethyl molecular substitution for the alkylamine corrosion inhibitors of the present invention varies between 1 up to z−1, where z is the number of active hydrogen atoms attached to the amino groups. Consequently, when speaking of specific corrosion inhibiting amino compounds, the indicated number of ethylene oxide units added to an amino compound is the average of the number of hydroxyethyl groups introduced into the molecule.

Suitable examples of ethoxylated amines according to the present invention is oleylamine+1EO, (tallow alkyl)amine+1EO, (rape seed alkyl)amine+1EO, (soya alkyl)amine+1EO, erucylamine+1EO, N-oleyl-trimethylenediamine+1EO, N-(tallow alkyl)trimethylenediamine+1EO, N-(rape seed alkyl)trimethylenediamine+1EO, N-(soya alkyl)trimethylenediamine+1EO, N-erucyl-trimethylenediamine+1EO, N-(tallow alkyl)trimethylenediamine+2EO, N-oleyl-trimethylenediamine+2EO, N-(rape seed alkyl)trimethylenediamine+2EO, N-(soya alkyl)trimethylenediamine+2EO, N-erucyl-trimethylenediamine+2EO, N,N-bis(3-aminopropyl)(rape seed alkyl)amine+1EO, N,N-bis(3-aminopropyl)(rape seed alkyl)amine+2EO, N,N-bis(3-aminopropyl)(rape seed alkyl)amine+3EO, N,N-bis(3-aminopropyl)(tallow alkyl)amine+1EO, N,N-bis(3-aminopropyl)(tallow alkyl)amine+2EO, N,N-bis(3-aminopropyl)(tallow alkyl)amine+3EO, N,N-bis(3-aminopropyl)(soya alkyl)amine+1EO, N,N-bis(3-aminopropyl)(soya alkyl)amine+2EO, N,N-bis(3-aminopropyl)(soya alkyl)amine+3EO, N,N-bis(3-aminopropyl)oleylamine+1EO, N,N-bis(3-aminopropyl)oleylamine+2EO, N,N-bis(3-aminopropyl)oleylamine+3EO, N-oleyl-N'-(3-aminopropyl)-1,3-propanediamine+1EO, N-oleyl-N'-(3-aminopropyl)-1,3-propanediamine+2EO, N-oleyl-N'-(3-aminopropyl)-1,3-propanediamine+3EO, N-(tallow-alkyl)-N'-(3-aminopropyl)-1,3-propanediamine+1EO, N-(tallow alkyl)-N'-(3-aminopropyl)-1,3-propanediamine+2EO, N-(tallow alkyl)-N'-(3-aminopropyl)-1,3-propanediamine+3EO, N-(rape seed alkyl)-N'-(3-aminopropyl)-1,3-propanediamine+1EO, N-(rape seed alkyl)-N'-(3-aminopropyl)-1,3-propanediamine+2EO, N-(rape seed alkyl)-N'-(3-aminopropyl)-1,3-propanediamine+3EO, N-(soya alkyl)-N'-(3-aminopropyl)-1,3-propanediamine+1EO, N-(soya alkyl)-N'-(3-aminopropyl)-1,3-propanediamine+2EO, N-(soya alkyl)-N'-(3-aminopropyl)-1,3-propanediamine+3EO, N-(3-aminopropyl)-N'-[3-(9-octadecenylamino)propyl]-1,3-propanediamine+1EO, N-(3-aminopropyl)-N'-[3-(9-octadecenylamino)propyl]-1,3-propanediamine+2EO, N-(3-aminopropyl)-N'-[3-(9-octadecenylamino)propyl]-1,3-propanediamine+3EO, N-(3-aminopropyl)-N'-[3-(9-octadecenylamino)propyl]-1,3-propanediamine+4EO, N-(3-aminopropyl)-N'-[3-(rape seed alkylamino)propyl]-1,3-propanediamine+1EO, N-(3-aminopropyl)-N'-[3-(rape seed alkylamino)propyl]-1,3-propanediamine+2EO, N-(3-aminopropyl)-N'-[3-(rape seed alkylamino) propyl]-1,3-propanediamine+3EO and N-(3-aminopropyl)-N'-[3-(rape seed alkylamino)propyl]-1,3-propanediamine+4EO.

Other examples of suitable corrosion inhibitors according to the present invention are the ethoxylated alkyl etheramines of formula I, where R is the group R'OCH$_2$CH$_2$CH$_2$ where R' is a hydrocarbyl group with 14-24, preferably 16-22, carbon atoms, and X, Y, and n have the same meaning as above.

Suitable examples of alkyl etheramines that could be used as starting materials for the ethoxylated alkyl etheramines are R'OCH$_2$CH$_2$CH$_2$NH$_2$ (VI) and R'OCH$_2$CH$_2$CH$_2$NHCH$_2$CH$_2$CH$_2$NH$_2$ (VII). Especially preferred examples of the ethoxylated alkyl etheramines are R'OCH$_2$CH$_2$CH$_2$NH$_2$+1EO, R'OCH$_2$CH$_2$CH$_2$NHCH$_2$CH$_2$CH$_2$NH$_2$+1EO and R'OCH$_2$CH$_2$CH$_2$NHCH$_2$CH$_2$CH$_2$NH$_2$+2EO, where R' is a hydrocarbyl group with 14-24, preferably 16-22, carbon atoms, e.g. tallow alkyl, soya alkyl, rape seed alkyl, octadecenyl or erucyl.

Further suitable examples of corrosion inhibitors according to the present invention are the amidoamines of formula I, where R is an acyl group having 14-24, preferably 16-22, carbon atoms, and X, Y, and n have the same meaning as above, and at least one of the symbols X and Y is CH$_2$CH$_2$OH. More preferred are the compounds where at least one of the symbols X and Y is hydrogen. The most preferred alkyl amidoamines are the monoamido monoamines

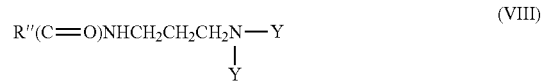

where Y is H or C$_2$H$_4$OH, provided that at least one Y is C$_2$H$_4$OH, and preferably at least one of the symbols Y is hydrogen. Examples of compounds VIII are the tallow or rape seed amide of N,N-bishydroxyethyl-1,3-propylenediamine, obtainable from the said amine and tallow or rape seed fatty acid respectively. Especially preferred aminoamides are the monoamido monoamines R"(C=O)NHCH$_2$CH$_2$CH$_2$NHCH$_2$CH$_2$OH (IX), obtainable from N-hydroxyethyl-1,3-propylenediamine and a fatty acid, such as rape seed fatty acid, soya fatty acid, tallow fatty acid, octadecenoic acid or erucic acid.

When producing the corrosion inhibitors of the present invention by ethoxylation of starting materials containing one or more amino groups, there will invariably be obtained mixtures of ethoxylated species with a different degree of substitution. These mixtures of ethoxylated amines, that contain the hydroxyethyl substituted amines of the invention, will normally contain a total of 10-50%, preferably 10-40% and most preferably 10-35% of primary amino groups, 10-70%, preferably 25-65% and most preferably 30-60% of secondary amino groups, and 10-50%, preferably 20-40% and most preferably 25-35% of tertiary amino groups. For example, when a fatty monoamine according to the formula R1NH$_2$ (II) is reacted with 1 mole of ethylene oxide, the result will be a mixture of ca 33% of unreacted primary amine, 33% of a secondary amine R1NHCH$_2$CH$_2$OH and 33% of a tertiary amine R1N(CH$_2$CH$_2$OH)$_2$. When a fatty diamine according to the formula R2NHCH$_2$CH$_2$CH$_2$NH$_2$ (III) is reacted with 1 mole of ethylene oxide, the mixture obtained will contain products with a total of 33% primary amino groups, 35% secondary amino groups and 31% tertiary amino groups. For a product obtained when a fatty diamine is reacted with 2 moles of ethylene oxide the distribution will be 12% primary amino groups, 54% secondary amino groups and 34% tertiary amino groups.

For corrosion, an especially severe environment is encountered in gas- and oil-field applications, in particular where work is done off-shore or on the coast, and where carbon dioxide or hydrogen sulfide corrosion of ferrous metal surfaces is particularly troublesome. Even more severe conditions apply when acid is added in oil-field acidizing and fracture-acidizing well stimulation treatments. The corrosion inhibitors of the present invention may be used under sweet-well conditions (brine containing carbon dioxide) as well as under sour-well conditions ($H_2S$ present), and with water solutions containing acid. The corrosion inhibitors will protect the metal surfaces of pipelines, pumps and other equipment used in the oil wells. The metals to be protected from corrosion by the corrosion inhibitors are preferably ferrous metals, such as iron and steel. The corrosion inhibitors may also work as scale inhibitors.

The amount of the amine corrosion inhibitor that is required to obtain a sufficient corrosion protection may vary with the application where it is used, but is suitably between 2% (w/w) and 2 ppm, preferably between 500 and 2 ppm and most preferably between 120 and 2 ppm.

In addition to the amine corrosion inhibitors of the present invention, other ingredients could be added to the corrosion inhibiting compositions. Examples of such ingredients are organic or inorganic acids, such as acetic acid, citric acid, hydrochloric acid and hydrofluoric acid, in which case the amines will be present as salts; a dispersing surfactant, such as nonionic ethylene oxide adducts; water-miscible solvents, such as methanol, ethanol, isopropanol or glycols; scale inhibitors; biocides, such as quaternary ammonium compounds, e.g. alkyl trimethylammonium chlorides; gelling or viscosity-enhancing agents, such as alkyldimethylamine oxides, alkylamidopropyldimethylamine oxides or quaternary ammonium salts, e.g. alkylbis(hydroxyethyl)methyl quaternary ammonium chloride; and other corrosion inhibitors, such as other amines, amides, or amphoterics.

The following embodiments illustrate the invention, and they should not be construed as limiting the scope thereof.

EXAMPLE 1

The following compounds were assessed for their substantivity by an ellipsometric technique. In this technique silicon wafers coated with chromium were placed in an ellipsometric cell and a solution of the substances in water was added (active concentration=100 ppm). The adsorption onto chromium was followed for at least 30 minutes, and the adsorbed mass was calculated.

TABLE 1

| Compound | Adsorbed mass $(mg/m^2)$ |
|---|---|
| (Coco alkyl)amine (Comparison) | 1.85 |
| (Tallow alkyl)amine (Comparison) | 2.01 |
| (Rape seed alkyl)amine* (Comparison) | 2.04 |
| (Rape seed alkyl)amine* + 1EO | 8.50 |
| N-(Coco alkyl)trimethylenediamine (Comparison) | 2.07 |
| N-(Coco alkyl)trimethylenediamine + 1EO (Comparison) | 4.5 |
| N-(Coco alkyl)trimethylenediamine + 2EO (Comparison) | 3.7 |

TABLE 1-continued

| Compound | Adsorbed mass $(mg/m^2)$ |
|---|---|
| N-(Coco alkyl)trimethylenediamine + 3EO (Comparison) | 2.7 |
| N-(Tallow alkyl)trimethylenediamine (Comparison) | 1.89 |
| N-(Tallow alkyl)trimethylenediamine + 1EO | 5.2 |
| N-(Tallow alkyl)trimethylenediamine + 2EO | 4.3 |
| N-(Tallow alkyl)trimethylenediamine + 3EO (Comparison) | 1.3 |
| N-(Rape seed alkyl)*trimethylenediamine (Comparison) | 2.41 |
| N-(Rape seed alkyl)*trimethylenediamine + 1EO | 4.6 |
| N-(Rape seed alkyl)*trimethylenediamine + 2EO | 4.5 |
| N,N-bis(3-aminopropyl)(tallow alkyl)amine (Comparison) | 0.92 |
| N,N-bis(3-aminopropyl)(tallow alkyl)amine + 1EO | 5.04 |
| N,N-bis(3-aminopropyl)(tallow alkyl)amine + 2EO | 4.64 |
| N,N-bis(3-aminopropyl)(tallow alkyl)amine + 3EO | 4.53 |

*from low erucic rape seed oil

From Table 1 it is evident that the adsorbed mass is greater when the amine has greater secondary characteristics. If the amine is fully substituted with ethylene oxide, to give an amine with tertiary characteristics, or if the amine is not substituted with ethylene oxide at all, the level of adsorption falls below that of a partially substituted amine. A low adsorption would mean that the compound is unlikely to be effective as a corrosion inhibitor.

EXAMPLE 2

A series of corrosion measurements were performed by the "bubble test method". In these a simulated "Forties" brine was used (Forties is an oil-field in the North Sea), which was saturated with $CO_2$ (pH ca 5.3), the test electrodes were typical pipeline steel (Grade API 5L X52 polished to 600 grit finish), the temperature was 50° C., and the solution was continuously stirred.

Forties Brine Composition:
Quantity of Salts for 1 Liter of Simulated Forties Brine

| | |
|---|---|
| $Na_2SO_4$ | 0.016 g |
| NaCl | 74.14 g |
| $NaHCO_3$ | 0.68 g |
| $MgCl_2*6H_2O$ | 4.21 g |
| $CaCl_2*6H_2O$ | 17.19 g |
| KCl | 0.71 g |

Procedure:

The brine solution was introduced into the test vessel, and the vessel was de-aerated by purging with $CO_2$ overnight. The temperature was then set at 50° C., and the pressure of $CO_2$ was kept at 1 bar. The polished electrode was degreased, rinsed and dried, after which it was put into the electrode holder and inserted into the test cell. The magnetic stirrer was started and a baseline corrosion rate was established by measuring the Linear Polarisation Resistance every 30 minutes (4-5 hours). Then the compounds to be investigated were introduced by injection into the solution at the concentrations specified in Table 2 using a micropipette. The corrosion rate was followed until it stabilised. The % protection was then calculated from the following equation:

% protection=$(1-(x/y))*100$ where x=corrosion rate in the presence of corrosion inhibitor (mm/year)

y=corrosion rate in the absence of corrosion inhibitor (mm/year)

TABLE 2

| Compound | % protection | | |
|---|---|---|---|
| | 10 ppm | 50 ppm | 100 ppm |
| (Tallow alkyl)amine + 1EO | | 89.7 | 86 |
| (Rape seed alkyl)*amine + 1EO | 91.4 | 92 | 94.5 |
| N-(Coco alkyl)trimethylene-diamine + 1EO (Comparison) | −20.3 | | |
| N-(Coco alkyl)trimethylene-diamine + 2EO (Comparison) | −28.7 | | |
| N-(Tallow alkyl)trimethylene-diamine + 1EO | 85 | 89.5 | 93.5 |
| N-(Tallow alkyl)trimethylene-diamine + 2EO | 77.1 | 87 | 89.5 |
| N-(Rape seed alkyl)*-trimethylenediamine + 1EO | 94.7 | 96 | |
| N-(Rape seed alkyl)*-trimethylenediamine + 2EO | 93 | 98.7 | |
| N,N-bis(3-aminopropyl)(rape seed alkyl)*amine + 2EO | 81.1 | | |
| N-(Rape seed alkyl)**-trimethylenediamine + 1EO | 90.7 | | |
| N-(Rape seed alkyl)**-trimethylenediamine + 2EO | 82.3 | | |

*from low erucic rape seed oil
**from high erucic rape seed oil

The table shows that particularly good protection is obtained with compounds having long alkyl groups with a high degree of unsaturation. For example the N-(Rape seed alkyl)trimethylenediamine+1 or 2EO (derived from low erucic rape seed oil) afford an excellent corrosion protection, which is very surprising since the comparative examples with products containing a coco alkyl chain do not afford any protection at all.

EXAMPLE 3

Corrosion measurements for some hydroxyethyl substituted aminoamides were performed by the same procedure as described in Example 2.

TABLE 3

| Compound | % protection | | |
|---|---|---|---|
| | 10 ppm | 50 ppm | 100 ppm |
| Tallow-CONH(CH$_2$)$_3$NHCH$_2$CH$_2$OH | 78.0 | 96.0 | 97.5 |
| Tallow-CONH(CH$_2$)$_3$N(CH$_2$CH$_2$OH)$_2$ | 59.5 | 93.5 | 93.5 |

Both of the aminoamide compounds in the table above are very efficient as corrosion inhibitors at 50 ppm and higher. During the test conditions the aminoamide compound where the amino group nitrogen is secondary is somewhat more efficient, especially at low concentrations, than the aminoamide compound where the amino group nitrogen is tertiary.

EXAMPLE 4

Corrosion rate measurements were performed under more severe conditions, where the electrodes were suspended in a rotating cage in an autoclave. The brine solution composition was the same as in example 2. The electrode was prepared from API 5L X52 grade steel and polished to 600 grit. The temperature was kept at 80° C., and the vessel was pressurized with 2 bar of $CO_2$.

Procedure:

The electrode was placed in the cell, and the cell was flushed with $CO_2$. The brine solution, that had been de-aerated, was transferred into the cell under a $CO_2$ blanket. The rotation speed was set to achieve the required wall shear stress. The temperature was set at 80° C., and the cell was continuously purged with $CO_2$. A baseline corrosion rate was established by measuring the Linear Polarisation Resistance. When a stable baseline had been established, the compounds to be investigated were introduced by injection into the solution at the concentrations specified in Table 4 using a micropipette. The corrosion rate was followed until it stabilised. The % protection was calculated by the equation used in examples 2 and 3.

As a comparison N-(Tallow alkyl)-trimethylenediamine+ 3EO, which is mentioned as one preferred compound in U.S. Pat. No. 3,029,125, was used.

TABLE 4

| Compound | % protection | | |
|---|---|---|---|
| | 50 ppm | 100 ppm | 150 ppm |
| (Rape seed alkyl)*amine + 1EO | 95.0 | 95.0 | 95.0 |
| N-(Rape seed alkyl)*-trimethylenediamine + 1EO | 90.5 | 95.0 | 91.0 |
| N-(Rape seed alkyl)*-trimethylenediamine + 2EO | 95.0 | 95.0 | 95.5 |
| N-(Tallow alkyl)-trimethylene-diamine + 3EO (comparison) | | 65.9 | 70.7** |
| Tallow-CONH(CH$_2$)$_3$NHCH$_2$CH$_2$OH | 94.5 | 98.0 | 98.0 |
| (Rape seed)*-CONH(CH$_2$)$_3$NHCH$_2$CH$_2$OH | 95.1 | 97.8 | 98.4 |
| (Rape seed)*-CONH(CH$_2$)$_3$N(CH$_2$CH$_2$OH)$_2$ | 92.7 | 93.7 | 95.0 |

*from low erucic rape seed oil
**measured at 200 ppm

The hydroxyethyl substituted amines according to the invention exhibited excellent corrosion protection also under the severe conditions prevailing in this test. The comparison test showed that the corrosion protection obtained by the prior art compound was inferior to the protection obtained from the compounds according to the invention.

The invention claimed is:

1. A method for the inhibition of corrosion on ferrous metal surfaces in an aqueous environment in oil field applications, wherein said method comprises adding to said aqueous environment a corrosion inhibiting effective amount of at least one hydroxyethyl substituted amine having the formula

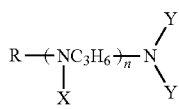

where R is a hydrocarbyl group having 14-24 carbon atoms, or the group R'OCH$_2$CH$_2$CH$_2$ where R' is a hydrocarbyl group with 14-24 carbon atoms; X is hydrogen, C$_2$H$_4$OH or the group

Y is hydrogen or C$_2$H$_4$OH and n is 0-3, with the proviso that at least one of the symbols X and Y is C$_2$H$_4$OH, at most one of the symbols X is

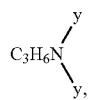
and at least one of the symbols X and Y is hydrogen.
2. The method of claim 1, where R is a hydrocarbyl group having 16-22 carbon atoms.
3. The method of claim 1, where n is 0-2.
4. The method of claim 3, where n is 1-2.
5. The method of claim 1, where R is the group R'OCH$_2$CH$_2$CH$_2$, where R' has the same meaning as in claim 1.
6. The method of claim 1 wherein said aqueous environment is in oil or gas wells.
\* \* \* \* \*